(12) United States Patent
Berkey et al.

(10) Patent No.: US 8,007,731 B2
(45) Date of Patent: Aug. 30, 2011

(54) FLUID TREATMENT DEVICE HAVING A MULTIPLE CERAMIC HONEYCOMB LAYERED STRUCTURE

(75) Inventors: George E. Berkey, Pine City, NY (US); Keith L. House, Corning, NY (US)

(73) Assignee: Corning Incorporated, Corning, NY (US)

( * ) Notice: Subject to any disclaimer, the term of this patent is extended or adjusted under 35 U.S.C. 154(b) by 1013 days.

(21) Appl. No.: 11/891,537

(22) Filed: Aug. 10, 2007

(65) Prior Publication Data

US 2009/0041635 A1 Feb. 12, 2009

(51) Int. Cl.
*B01D 50/00* (2006.01)
*F01N 3/10* (2006.01)

(52) U.S. Cl. .......... 422/177; 422/180; 422/211; 60/274; 60/279

(58) Field of Classification Search .......... 422/177, 422/180, 188, 211, 220, 222; 428/593; 60/274, 60/279
See application file for complete search history.

(56) References Cited

U.S. PATENT DOCUMENTS

| | | | | |
|---|---|---|---|---|
| 3,887,741 A * | 6/1975 | Dwyer | ............ | 428/188 |
| 4,828,807 A | 5/1989 | Domesle et al. | ............ | 423/213.7 |
| 5,051,241 A | 9/1991 | Pfefferle | ............ | 422/180 |
| 5,108,716 A | 4/1992 | Nishizawa | ............ | 422/171 |
| 5,591,413 A * | 1/1997 | Toyoda | ............ | 422/180 |
| 5,863,508 A * | 1/1999 | Lachman et al. | ............ | 422/171 |
| 6,227,699 B1 * | 5/2001 | Wight, Jr. | ............ | 366/336 |
| 6,258,334 B1 | 7/2001 | Gadkaree et al. | ............ | 423/210 |
| 6,623,704 B1 | 9/2003 | Roth | ............ | 422/179 |
| 6,793,896 B1 * | 9/2004 | Swars | ............ | 422/180 |
| 6,824,749 B2 * | 11/2004 | Leloup et al. | ............ | 422/220 |
| 7,141,530 B2 | 11/2006 | Dullien et al. | ............ | 502/527.11 |
| 7,182,924 B2 | 2/2007 | Brundage et al. | ............ | 422/211 |
| 7,655,064 B2 * | 2/2010 | Kato et al. | ............ | 55/521 |
| 2002/0076372 A1 | 6/2002 | Leloup et al. | ............ | 422/222 |

FOREIGN PATENT DOCUMENTS

| | | |
|---|---|---|
| EP | 1 128 031 A1 | 8/2001 |
| EP | 1 357 269 A2 | 10/2003 |
| EP | 1 357 270 A2 | 10/2003 |
| JP | 63113112 | 5/1988 |

OTHER PUBLICATIONS

Brautsch, Andreas, et al., "Heat transfer characterization of support structures for catalytic combustion", International Journal of Heat and Mass Transfer 45 (2002) 3223-3231.

Brück, Rolf, et al., "Turbulent Flow Catalyst: Solution for Euro 5 and beyond", Oct. 2006, www.emitec.com/download/library/en/Turbulent%20Flow%20Catalyst_Draft_final.pdf.

* cited by examiner

*Primary Examiner* — Nina Bhat
(74) *Attorney, Agent, or Firm* — Susan S. Wilks

(57) ABSTRACT

A device for treating fluids, such as automotive exhaust gases is provided, as well as a method of manufacturing such a device. The device provides a honeycomb structure, a matrix of ceramic walls that defines a plurality of parallel, fluid-conducting cells oriented along an axis, arranged in a stacked or discontinuous configuration between an inlet and outlet, where adjacent layers of honeycomb structure are separated by layers of air spaces. Each matrix layer has opposing faces that defines the inlets and outlets of the cells, and a peripheral portion or peripheral region including an outer skin. The peripheral portions or peripheral regions of adjacent stacked ceramic layers are mutually contiguous to prevent fluid flowing through the stacked ceramic layers from leaking between said outer skins.

27 Claims, 12 Drawing Sheets

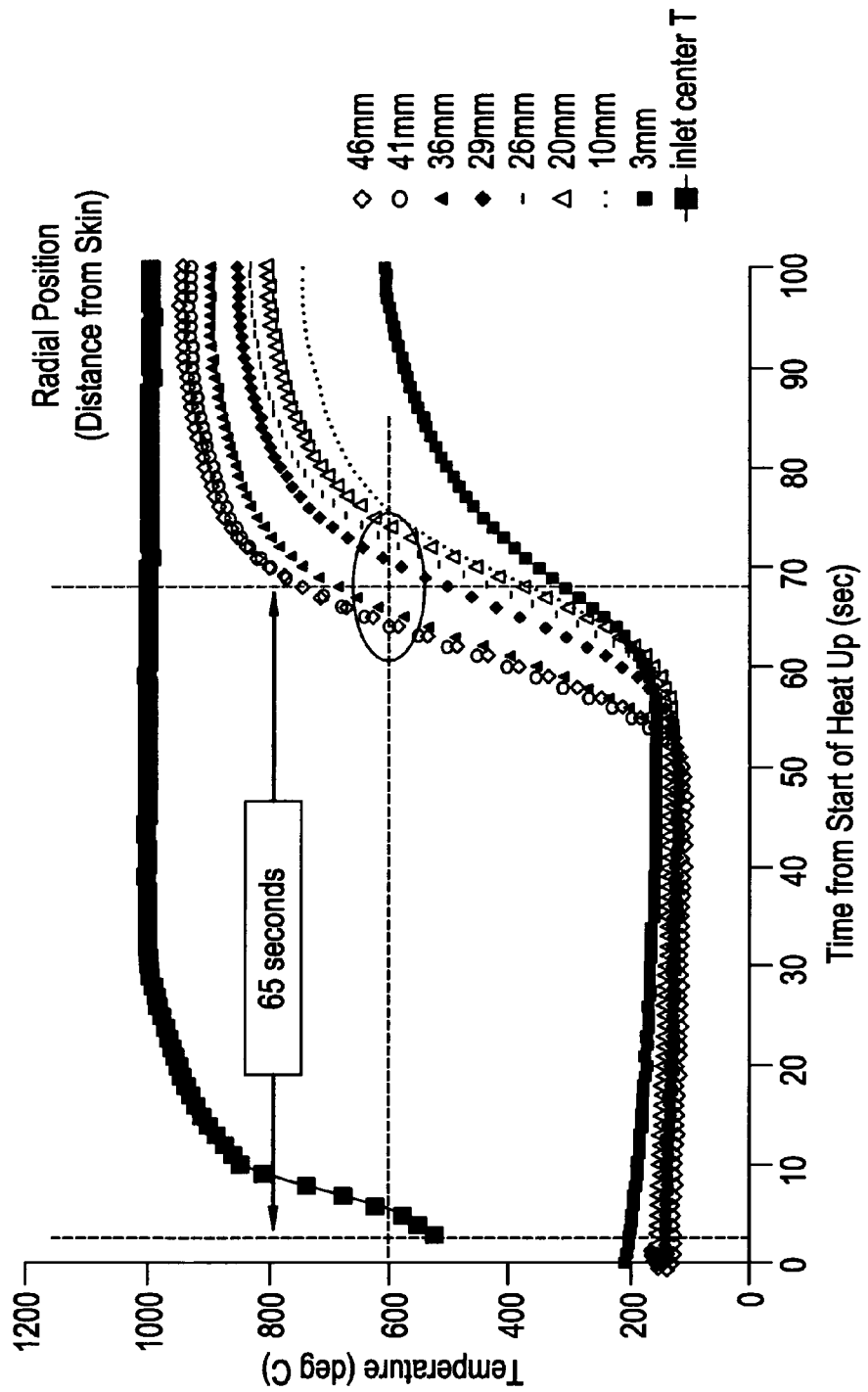

FLUID TREATMENT DEVICE HAVING A MULTIPLE CERAMIC HONEYCOMB LAYERED STRUCTURE

FIELD OF THE INVENTION

This invention generally relates to fluid treatment devices, and is specifically concerned with a multiple layer ceramic honeycomb structure for treating exhaust gases, where the layers of honeycomb structure are separated by air spaces, and methods of making the multiple layer ceramic honeycomb structure.

BACKGROUND OF THE INVENTION

Ceramic honeycomb structures are used in vehicular exhaust systems to reduce pollutants. Such structures generally have a network of interconnected walls that form a matrix of elongated, gas-conducting cells which may be square, octagonal or hexagonal in shape. This matrix has been described as a "honeycomb" matrix. For example, the network of walls may be surrounded by a cylindrical outer skin that is integrally connected to the outer edges of the walls to form a cylindrical- or oval-shaped cylindrical structure having opposing inlet and outlet ends for receiving and expelling exhaust gases through the honeycomb matrix of walls.

Such ceramic honeycomb structures may be used as either particulate filters in the exhaust systems of diesel-powered automobiles or other equipment, or as chemical filters such as automotive catalytic converters. When used as particulate filters, the open ends of the cells on the inlet and outlet ends of the structure are preferably plugged in "checkerboard" fashion such that exhaust gases entering the inlet end of the structure must pass through the porous ceramic walls before they are allowed to exit the open ends of the cells at the outlet end of the structure. When used as catalytic converters, the cells remain unplugged so that the exhaust gases may flow directly through them, and the walls defining the cells are coated with a precious metal catalyst containing platinum, rhodium, or palladium, for example. The catalyst impregnated onto and into the walls promotes chemical reactions that convert CO, NOx and hydrocarbons into non-polluting compounds such as $H_2O$, $O_2$ and $N_2$. A useful measurement of the effectiveness of a catalyzed substrate is the light-off temperature—the temperature of the gas stream entering the substrate at the time when the gas stream exiting the substrate has 50% lower levels of pollutants than the entering gas stream. Both applications of ceramic honeycomb structures are important in reducing pollutants that would otherwise be expelled into the environment.

Ceramic honeycomb structures are formed by extruding a wet, paste-like, ceramic precursor to cordierite, mullite, silicon carbide, or aluminum titanate through a die to simultaneously form the network of walls preferably along with the integrally-connected outer skin. The resulting extruded green body is cut, dried and moved to a kiln which converts the green ceramic body into a fired ceramic body. The fired body may then either be plugged in the aforementioned pattern to form a diesel particulate filter, or subjected to a catalyst wash coat in order to impregnate the walls of the flow-through cells with the catalyst.

The effectiveness of a ceramic structure used as a catalytic converter is dependent in part upon the amount of intimate contact achieved between the exhaust gas and the catalyst-coated cell walls. Unfortunately, the fluid mechanics between a predominantly laminar flow of exhaust gas and the cell walls of a standard honeycomb ceramic structure are not conducive to the efficient achievement of intimate contact between the catalyst and the pollutant molecules.

One way to improve such contact would be to increase the cell density, thereby increasing both the area of initial impingement between the gas or fluid and the leading edges of the honeycomb structure, as well as the total area of the cell walls defining the flow channels. However, there are drawbacks to this strategy as increased cell density also increases both the amount and hence expense of the precious metals used as the catalyst, as well as the back pressure the converter applies to the exhaust system. Another strategy would be a more efficient use of the catalyst applied over the surfaces of the honeycomb cells. To this end, ceramic honeycomb designs have been proposed that provide holes or intersecting channels between the flow-path channels to promote better mixing, or a spiral shape to the cell walls for the same purpose.

There is a need for a more efficient honeycomb-type fluid treatment device that provides a greater amount of intimate contact between a fluid, such as an automotive exhaust gas, and the cell walls of a honeycomb structure, without increasing the back pressure that the device applies to the fluid flow and without the need for additional amounts of expensive precious metal catalysts or other treatment agents present in the cell walls.

SUMMARY OF THE INVENTION

Generally speaking, the invention is a fluid treatment device particularly adapted for the treatment of exhaust gases that improves the performance of the device. To this end, embodiments of the fluid treatment device of the present invention comprise multiple honeycomb ceramic layers arranged in a stacked configuration between an inlet and outlet. Each ceramic layer includes a matrix of ceramic walls that defines a plurality of parallel, fluid-conducting cells oriented along an axis. In embodiments, each matrix has opposing faces that define inlets and outlets of the cells of that matrix, and a peripheral portion or peripheral region which may or may not include an outer skin. The peripheral portions or peripheral regions of adjacent stacked ceramic layers may be mutually contiguous to prevent fluid, flowing through the stacked ceramic layers, from leaking between the outer skins. To this end, the mutually contiguous peripheral portions or peripheral regions may either be integrally formed into one another, or mutually engaged in sealing contact. The stacked ceramic layers provide multiple inlet faces, thereby multiplying the area of impingement interface between fluids (such as exhaust gases) flowing through the fluid treatment device, and the inlet edges of the honeycomb matrix structures. In embodiments, the honeycomb matrix may be made from porous ceramic material such as cordierite, aluminum titanate, mullite or silicon carbide. The honeycomb matrix may be inorganic or organic, oxide or non-oxide, may incorporate catalytic compounds, either as a surface treatment or imbedded in the substrate. In embodiments the honeycomb material may be carbon.

The faces between adjacent ceramic layers are axially spaced apart to promote radial flow or to interrupt laminar flow of the fluid between the ceramic layers. Such radial flow not only promotes better mixing between the fluid and the channel edges, it also reduces the radial heat gradient across the flow area when a heated fluid is conducted through the device, which is particularly advantageous when the device is used as a catalytic converter in an automotive exhaust system. Additionally, in embodiments, the multiple ceramic layers are substantially disc-shaped to provide relatively large flow path areas relative to volume to further promote impingement between the fluid and the inlet edges of the fluid-conducting cells. In additional embodiments, the opposing end faces may be recessed or shaped, for example, the end faces may be concave, to create spaces between adjacent stacked honeycomb layers.

The invention also encompasses methods of manufacturing a fluid treatment device comprising the steps of: providing multiple honeycomb ceramic layers as previously described, stacking the multiple layers together, and rendering the peripheral portions or peripheral regions of adjacent stacked ceramic layers mutually contiguous to prevent fluid from flowing out between the layers.

In embodiments of the method, a single green honeycomb ceramic structure, a monolith, is first provided. A monolith, as provided herein, is a single honeycomb body having a plurality of continuous, uninterrupted, parallel fluid-conducting cells oriented along an axis. A monolith may be green or fired, and may be any shape or size. A portion of the honeycomb matrix is removed by a matrix removal tool at two or more sections along the axis of the structure to define multiple axially spaced-apart green body honeycomb ceramic layers in a stacked configuration wherein the peripheral portions or peripheral regions of adjacent stacked ceramic layers remain integrally connected to one another. When a matrix removal tool is used to cut away material from a monolith, there may be portions of the honeycomb matrix which remain uncut, providing cells in the peripheral portion or peripheral region of the honeycomb structure which remain intact and uninterrupted along portions of the honeycomb structure or along the entire length of the honeycomb structure. In addition, holes may exist where the matrix removal tool accessed the interior of the monolith structure to cut away matrix material. These holes may be plugged. The structure is then fired. If the fired body is to be used as an exhaust gas treatment device, such as a catalytic converter, a washcoat of particulate palladium and/or other metals may be impregnated onto and into the interior surfaces of the honeycomb matrix of one or more layers.

In additional embodiments of the method, a single green body honeycomb ceramic structure having a honeycomb matrix as described is first provided. The green body honeycomb ceramic structure is then cut orthogonally with respect to its axis into layers, each of which includes opposing faces. At least one face of the honeycomb matrix is then recessed. The layers are then stacked such that the recessed faces of the matrices create an axial space between the matrices of adjacent layers, and the peripheries of the layers are mutually contiguous. The mutually contiguous peripheries of the stacked layers are then connected or pasted together into a single integral structure, which is subsequently fired.

In still additional embodiments of the method, multiple separate honeycomb ceramic layers having peripheral portions or peripheral regions that terminate in edges having a same shape and size, are fabricated. These at least three separate honeycomb ceramic layers are then stacked so that their outer peripheral edges are mutually contiguous and engaged with one another to prevent leakage of fluid between adjacent honeycomb ceramic layers. When the fluid treatment device is used to treat exhaust gases, this third method facilitates the manufacture of a catalytic converter having different catalytic compositions in each of its layers, or a catalytic converter wherein one of the layers is a particulate filter. In embodiments, one or more layers may have a coating of catalytic material at their leading edge faces but not at their trailing edge faces.

The applicants have serendipitously observed that, in addition to improved impingement between the fluid and the inlet edges of the cells of the honeycomb (which in turn results in better filtration or catalytic breakdown, depending on the application of the device) embodiments of the device of the invention have an improved thermal profile across the radius of the honeycomb structure, which shortens the light-off time required to activate the catalyst when the device is used as a catalytic converter. Embodiments of the present invention advantageously reduce thermal stresses and shorten firing times when the green body precursor of the device is fired into a ceramic structure. Additionally, the provision of axial spaces between adjacent layers in embodiments of the invention has been found to significantly reduce the back pressure that the device exerts on a flow of fluid, which again is particularly advantageous when the device is used to treat automotive exhaust gases.

DESCRIPTION OF THE SEVERAL VIEWS OF THE DRAWINGS

FIGS. 11A and 11B are graphs illustrating the times required for a prior art ceramic honeycomb structure and a ceramic structure embodying the invention to attain a diametric temperature profile effective to activate a catalyst for breaking down exhaust gases, demonstrating the shorter light-off time for the honeycomb structure of the invention when a hot exhaust gas is conducted through it.

DETAILED DESCRIPTION OF THE PREFERRED EMBODIMENTS

Figure 1:
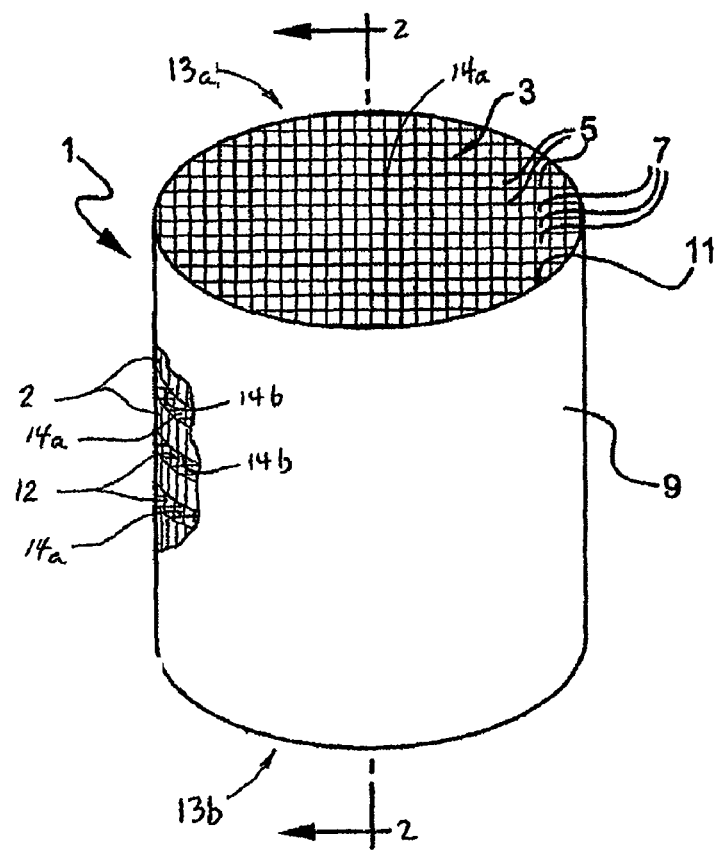
FIG. 1 is a perspective view of a first embodiment of the fluid treatment device of the invention with a portion of the outer skin removed to show the layered interior of the device.

Embodiments of the present invention provide ceramic honeycomb structures where ceramic walls define a plurality of parallel, fluid-conducting cells oriented along an axis, where the fluid conducting cells are not continuous along the axial length of the honeycomb structure, but are instead discontinuous, or interrupted by air spaces or air pockets. In embodiments, the discontinuous honeycomb structures or discontinuous cell wall substrates (DCWs) of the present invention are composed of layers of honeycomb material, arranged one above the other, structured and arranged to provide air spaces or air pockets between successive layers. These DCW substrates may be made of glass, ceramic, metal, carbon or other materials. Ceramic materials may include aluminum titanate, mullite, silicon carbide or cordierite.

In embodiments, the individual honeycomb layers are concave at their end faces to provide for air pockets that are larger at the center of the honeycomb structure than at its periphery. In embodiments, these individual honeycomb structures may be shaped at their end faces, concave for example, to provide for air pockets at the center of the honeycomb structure but which maintain the structural integrity of the parallel cells at the peripheral portion or peripheral region of the honeycomb structure. While embodiments may be described herein as cylindrical or can shaped, and the layers as disc-shaped, the invention encompasses a fluid treatment device having a cross section and layers of virtually any shape, whether convex or concave, symmetrical or asymmetrical (i.e. oval, triangular, square, rectangular, crescent-shaped, polygonal, etc.).

In additional embodiments, the honeycomb layers are integrally formed, and a common recess or air space is provided by excising or cutting away portions of the honeycomb structure. That is, a single honeycomb body is extruded and a cutting device is used to remove portions of the honeycomb structure, resulting in a layered, discontinuous cell wall honeycomb structure where some of the parallel, fluid-conducting cells remain intact. The intact cells may be in a peripheral region or peripheral portion of the honeycomb structure. The end faces of these layers may be shaped or flat, depending upon the shape of the cutting tool. For example, embodiments of the invention include discontinuous layered honeycomb structures where a peripheral portion or peripheral region, which may be a skin or a peripheral region of cells or both, remains intact. The peripheral portion or peripheral region of cells can be an annular arrangement of integrally formed cells within the honeycomb structure which remain continuous. This peripheral portion or peripheral region may be in the air space layers. This peripheral portion or peripheral region of cells may occupy a radial distance from the outer periphery of 0.005 to 1 inch, or from 0.05 inches 0.5 inches, or from 0.005 inches to 0.05 inches, and may provide structural support for the overall discontinuous honeycomb structure.

In still additional embodiments, the discontinuous honeycomb structure may be assembled from separate layers of honeycomb material which may be stacked together to form layers of honeycomb alternating with layers of air spaces. These assembled honeycomb structures may be bonded together by providing ceramic slurry or paste or other bonding material to the layers. Or, an external skin may be applied to stacked layers of honeycomb material to form a skin to define a peripheral portion or peripheral region. These stacked layers may be aligned from one layer to the next so that the parallel, fluid-conducting cells of one layer match up with the parallel, fluid-conducting cells of the next layer.

The present invention includes embodiments of methods of making the discontinuous honeycomb structure of the present invention. Flat-faced or concave honeycomb layers can be formed into a single multi-layered honeycomb structure, structured and arranged to provide air spaces or air pockets between successive honeycomb layers. In embodiments, the discontinuous honeycomb structure can be formed by providing a single honeycomb structure and removing interior portions of the honeycomb structure to form a discontinuous honeycomb structure structured and arranged to provide air spaces or air pockets between successive layers of honeycomb structure. Honeycomb structure could be removed by machining, and the removed area may be in any shape including disc-shaped, pillars, bars, cup-shaped or spherical.

In additional embodiments, honeycomb structures can be formed into a single multi-layered honeycomb by stacking together individual flat or concave-faced honeycomb discs, and sealing the discs together at their edges by providing a continuous outer skin around the periphery of the stacked honeycomb structure, thereby forming a stacked honeycomb structure. Or, in embodiments, the stacked honeycomb discs can be connected by pillars or walls of material to maintain the structural integrity of the discontinuous honeycomb body. Or, in additional embodiments, individual honeycomb layers or discs, which may have flat faces or shaped faces can be assembled into a stacked configuration and these stacked discs can be surrounded by a layer of wrapping material such as vermiculite, and slipped into a can and treated to create a closed container containing layers of honeycomb structures structured and arranged to provide air spaces or air pockets between successive honeycomb structures, forming a discontinuous honeycomb structure without an outer skin or outer wall.

Figure 2:
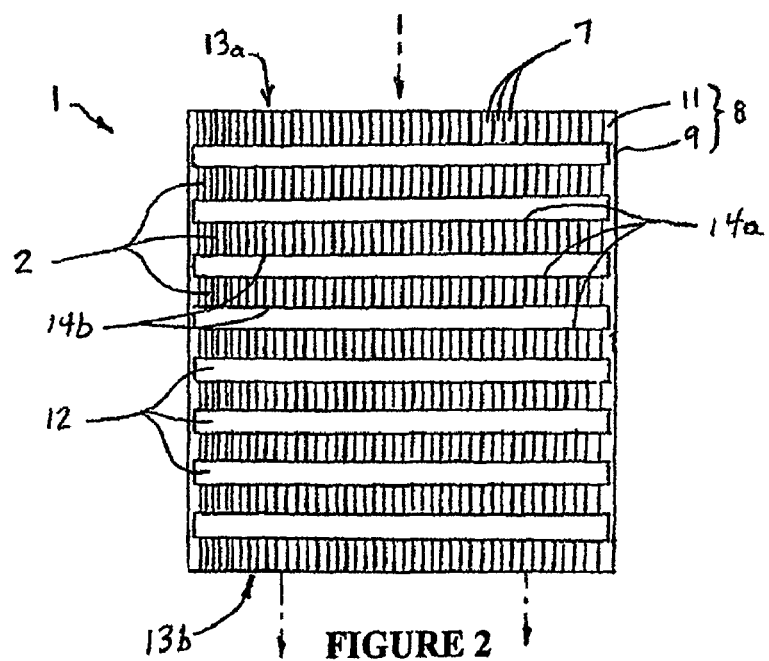
FIG. 2 is a side cross-sectional view of the device of FIG. 1 along the line 2-2.

With reference now to FIGS. 1 and 2, an embodiment of the fluid treatment device 1 that is particularly useful as a catalytic converter for automotive exhaust gases having a plurality of stacked, honeycomb layers 2 is described. In FIGS. 1 and 2 these layers are disc-shaped, but it will be understood by those of skill in the art that the layers can be of any shape suitable for use as fluid treatment devices. Each of the layers 2 includes a honeycomb matrix 3 of integrally connected walls 5 that define gas-conducting cells 7 extending in parallel along the axial length of the device 1. The density of the cells 7 may be approximately 900 cells per square inch in order to maximize the area of contact between the automotive exhaust gases which blow directly through the gas conducting cells 7, and the walls 5. However, the cell density may be higher or lower (i.e., between 100 and 1200 cells per square inch) depending on the application of the device 1. To reduce the pressure drop that the device 1 imposes on the automotive exhaust system, the walls 5 may be rendered quite thin, i.e. on the order of 2-6 mils.

Each of the disc-shaped layers 2 may have a peripheral portion or peripheral region 8 including an outer skin 9 that is integrally connected to the outer edges 11 of the walls 5 of the matrix 3. In an embodiment of the present invention, the outer skin 9 has a thickness that is approximately three times the thickness of the walls 5 to protect the fragile outer edges 11 of the matrix 3. The resulting can-shaped device 1 has an inlet end 13a for receiving exhaust gases from a diesel engine or automobile engine, and an outlet end 13b for expelling these gases. It should be noted that while an outer skin 9 is present in all of the several illustrated embodiments, such a skin is not required to implement the invention, and the peripheral portion or peripheral region 8 as used herein may or may not include an outer skin 9.

In embodiments, the peripheral portions or peripheral regions 8 of adjacent stacked layers 2 are mutually contiguous to prevent exhaust gas or other treated fluid from flowing out between two adjacent layers 2. In this application, "mutually contiguous" means that the peripheral portions or peripheral regions 8 of adjacent stacked layers are either integrally formed with one another, in engagement with one another, or connected or bonded to one another by, for example, a layer of skin 9. In the particular embodiment of the device 1 shown in FIGS. 1 and 2, the peripheral portions or peripheral regions 8 of adjacent stacked layers 2 are integrally formed with one another. That is, the discontinuous honeycomb structure has been formed by extruding a monolith honeycomb structure, and cutting away interior sections of the honeycomb matrix, to create alternating layers of honeycomb matrix and air spaces inside the integral honeycomb structure. In this embodiment, the peripheral portion or peripheral region 8 may be made of cells which have not been cut away or excised, and which therefore extend uninterrupted along the entire length of the fluid treatment device.

Adjacent stacked layers 2 are axially spaced apart in embodiments to form axial spaces 12 between the leading edge face 14a of one of the ceramic layers 2 and the trailing edge face 14b of an adjacent ceramic layer 2 in order to promote a radially-oriented flow of fluid between layers 2. The embodiment of the device 1 illustrated in FIGS. 1 and 2 have nine stacked disc-shaped layers. However, the fluid treatment device of the invention may include between two and twenty layers 2. Additionally, while the axial extent of the spaces 12 is shown as being less than the axial extent of the layers 2, the axial extent of the spaces 12 may be anywhere between 5% and 400% of the axial extent of the layers 2. In embodiments, the stacked honeycomb or discontinuous cell wall substrate (DCW substrate) has some volume regions of honeycomb material (20 to 80% of the total volume) alternating with some volume regions of open space (20 to 80% of the total volume). In additional embodiments, the stacked honeycomb, or discontinuous cell wall substrate, has 30 to 70% of the total volume as honeycomb and 30 to 70% of the total volume as void, or has 50 to 70% of the total volume as honeycomb and 30 to 50% as void. In an additional embodiment, the DCW substrate has 60% of its volume as honeycomb structure and 40% of its volume as void. Depending upon the method employed to create open spaces or air spaces within the honeycomb device, these layers of open spaces may be irregularly shaped. That is, the area that remains un-cut in the open space layer may not be uniform around the perimeter of the open space.

In operation, a flow of pressurized fluid, which may be automotive exhaust gases, is conducted through the inlet 13a of the device 1. Most of the resulting flow through the web matrix 3 is laminar. That is, fluid flows in parallel layers through the parallel cells of the honeycomb apparatus. Once this fluid flow is established through the parallel cells of the honeycomb structure, contact between pollutants in the fluid and catalytic substrates, coated along the walls of the cells, occurs by diffusion. This diffusion process can be slow and inefficient.

The layer of fluid flowing through the honeycomb cells adjacent to the cell walls has the most intimate contact with catalytic chemicals residing in the cell walls. Because of the slow and inefficient nature of the diffusion process, more catalyst material must be used to accomplish a satisfactory level of exhaust gas purification. Any disruption in the laminar flow of fluid through the honeycomb cells which causes the layer of fluid flowing through the honeycomb cells adjacent to the cell walls to mix or move and which allows new gas particles to flow adjacent to the honeycomb walls will increase the efficiency of the diffusion-limited catalytic process.

Introducing spaces along the length of the parallel honeycomb cells introduces radial mixing of fluid streams, and allows for a disruption in the laminar flow of fluid through the honeycomb cells, and therefore improves the efficiency of the catalytic process. This has several effects. First, less precious metal coating may be required in a discontinuous or stacked honeycomb structure of the present invention to create the same level of gas cleansing because the diffusion process is more efficient. Second, less surface area of honeycomb may be necessary to reach the same level of gas cleansing. Third, the introduction of spaces, areas that do not require fluid to flow through small honeycomb channels, reduces the back pressure across the device. Reduction in the back pressure of exhaust filtration devices improves horse power and gas mileage. Fourth, disruptions in the laminar flow of fluid also results in a more rapid and more uniform heating up of the web matrices 3 contained in the device 1 in a case where a hot fluid is initially conducted through the device, as would be the case when the device is used as a catalytic converter and the vehicle engine is initially started. In addition, the reduced thermal mass of the substrate due to portions of the honeycomb being absent will give a more rapid heating. The resulting more rapid and more uniform heating up of the device 1 across its radius shortens the light-off time of the catalytic converter, which is the time delay from engine start-up to the point where the gas stream exiting the substrate has 50% reduced levels of pollutants versus the entering gas stream.

Not wishing to be held to a particular theory, Applicants believe that the boundary layer of fluid such as exhaust gasses in laminar flow is thinnest where the fluid impinges the leading edge face 14a of the web matrix 3, and that the boundary layer becomes thicker as the fluid flows further down the flow paths defined by the cells 7, thus reducing intimate contact between pollutant molecules and catalyst, for a catalytic process, and reducing the efficiency of gas flow across the porous ceramic wall, for a particulate filtration process. Hence the largest amount of direct, intimate contact between the molecules forming the fluid and the walls 5 of the cells 7, where catalytic reactions occur and where the fluid can pass through the porous walls of the honeycomb structure, occurs at the leading edge face 14a of the web matrix, where the boundary flow layer is thinnest. By contrast, the thicker boundary flow layer that occurs deeper within the cells 7 interferes with such direct, intimate contact. While some amount of intimate contact occurs between the molecules of fluid and the cell walls 5 due to diffusion, the amount of contact generated by such diffusion is far less than the amount of intimate contact achieved at the leading edge face 14a of the ceramic structure.

Prior art ceramic honeycomb structures provide only a single leading edge face 14a of a web matrix for a flow of fluid to impinge. By contrast, the provision of layers 2 of honeycomb matrices 3 exposes the flow of fluid to two or more leading edge faces 14a, thereby potentially doubling the area of intimate contact generated by the thin boundary of fluid flow in this region. Additionally, the axial spacing apart of the ceramic layers 2 creates spaces 12 that promote radial flow of the molecules forming the fluid. Such radial flow of the fluid advantageously promotes mixing and more uniform contact between the downstream leading face edges 14a presented by the subsequent layers 2. That is, the absence of cell walls in some regions of the DCW substrate may result in less viscous drag on the fluid that is flowed through the substrate. This may translate to a reduced pressure drop.

Because of this increased fluid flow efficiency provided by increasing the number of leading edge faces in the honeycomb structure, less catalytic material may be necessary to accomplish the same level of catalysis. It may be possible to attain an acceptable level of catalysis by applying catalytic material to only a portion of the honeycomb layer 2. For example, applying catalytic material to the leading edge face 14a of a layer 2 of honeycomb matrix may provide an acceptable level of catalysis while significantly reducing the amount of expensive catalytic material used in the device. For example, it may be possible to dip a honeycomb layer in a washcoat solution so that only the leading edge, up to a certain depth, is coated. The washcoat may be applied to half of the honeycomb layer, which may result in the use of half of the usual amount of catalytic material.

This partial application of catalytic material may be provided to, for example, the leading edge and to 75% to 10%, 50% to 25% or 30% to 10% of the axial length of the honeycomb layer 2, as measured from the leading edge face. Those of skill in the art will recognize that an application of catalytic material to the leading edge of the honeycomb layer will be advantageous in reducing costs if the catalytic material is applied to anything less than 100% of the honeycomb layer. This partial application may be accomplished by dipping a honeycomb layer, leading edge face first, into a bath containing catalytic washcoat. This partially coated layer may then be assembled into a stacked multi-layer discontinuous honeycomb structure.

Figure 3:
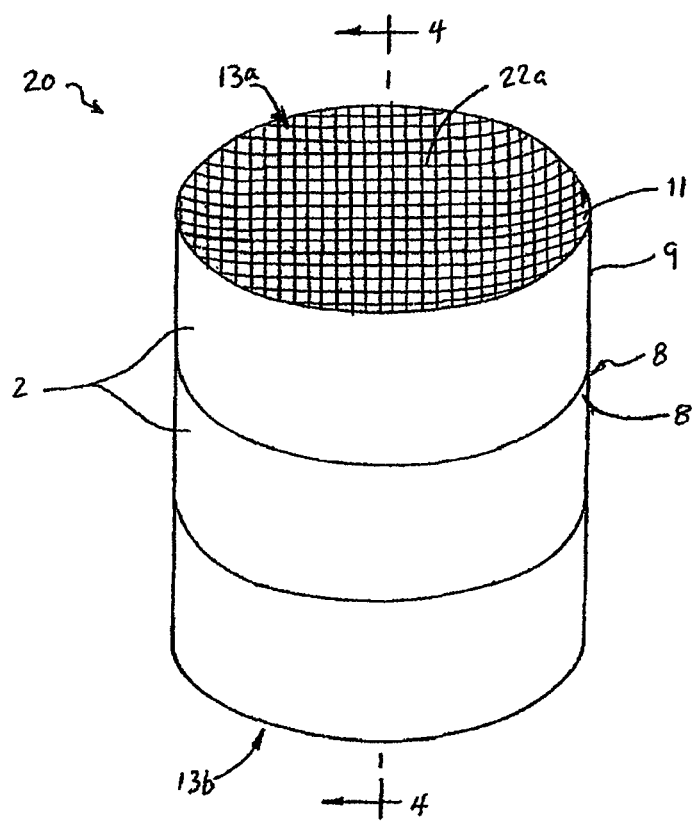
FIG. 3 is a perspective view of a second embodiment of the device of the invention.
Figure 4:
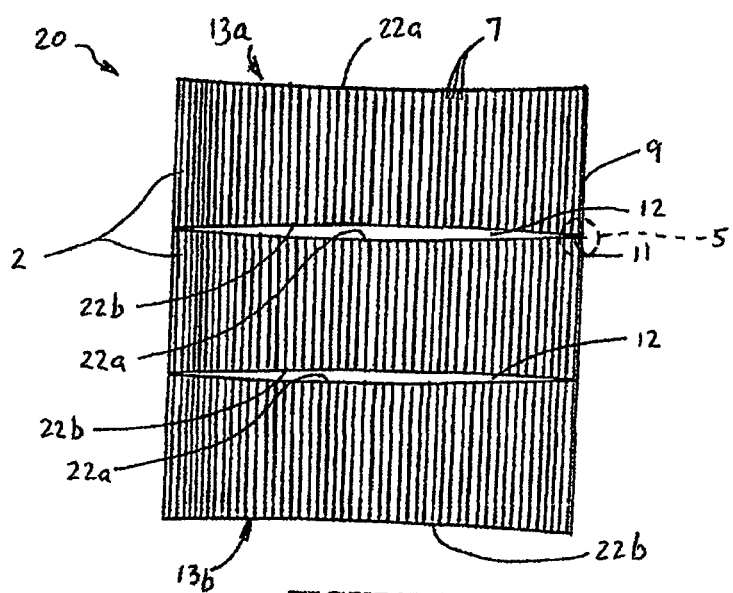
FIG. 4 is a side cross-sectional view of the device of FIG. 3 along the line 4-4, illustrating how the contiguous concave faces of the three disc-shaped ceramic layers function to axially space apart the inlet faces of the three layers.

FIGS. 3 and 4 illustrate an alternative embodiment 20 of the fluid treating device. In this embodiment 20, disc-shaped layers 2 are separate ceramic structures whose peripheral portions or peripheral regions 8 are of the same size and shape and are mutually engaged or mutually bonded with one another to an extent necessary to prevent fluid flowing through the device 20 from leaking between the layers 8. In embodiments, the leading face 22a and the trailing edge face 22b may be flat or shaped. In the embodiment illustrated in FIGS. 3 and 4, the leading face 22a and the trailing edge face 22b of the separate layers 2 have a concave shape such that a lens-shaped axial space 12 is defined between the leading and trailing faces 22a, 22b of adjacent layers 2. While the faces 22a, 22b could be shaped to create a recess shape between adjacent layers in other shapes (for example, spiral, or other carved shapes) to form the axial spaces 12 between the layers 2, the applicants have found that concave recessing is relatively easy to grind in the faces of the fired ceramic discs that are used to assemble the device 20. Even though the use of such recessing places practical limits on the maximum ratio between the axial extent of the spaces 12 and the axial extent of the layers 2, the applicants have found that a substantial amount of radial flow between the layers 2 may be realized even when this recessing only applies to 5% to 10% of the axial length of the honeycomb layer. The positioning and bonding of ring-type ceramic structures between ceramic discs to achieve the desired axial spaces 12 is also within the scope of the invention.

For example, honeycomb structures may be extruded and cut into appropriately sized layers. These layers may then be fired. Or, honeycomb structures may be extruded and fired, and then cut into appropriately sized layers. The layers may then be ground on the end faces to create a flat or shaped end face. In embodiments, the peripheral portion or peripheral region of the layers may be ground or unground, as necessary to create a peripheral area structured and arranged to be sealed to an adjacent layer. The layers may be wash-coated with precious metals to create catalytic substrates or plugged to form particulate filter substrates. A device may be assembled in a stacked configuration, where the layers are held together by any connecting material such as glue, paste, ceramic paste, tape or other connecting methods, wrapped with ceramic mat material or insulating material such as a vermiculite blanket or other known material, placed into a can, and treated ("popped") to form an exhaust filter. For example, the adjacent stacked layers may be ceramically bonded to each other with a paste or a ceramic paste, which may form a layer of skin 9 along the entire length of the stacked honeycomb, or may be applied at the joints where adjacent stacked layers meet. This treatment may include heating the canned filter, for example, to 650° C. In a heating step ("popping"), the connecting material may be hardened, in the case of ceramic paste, or may be burned away, as in the case of tape. In addition some materials such as vermiculite so treated expand to hold the discs in place inside the can. When assembled in this manner, gasses are prevented from flowing out between two adjacent layers of honeycomb by the vermiculite blanket and the metal skin of the can structure.

Figure 5:
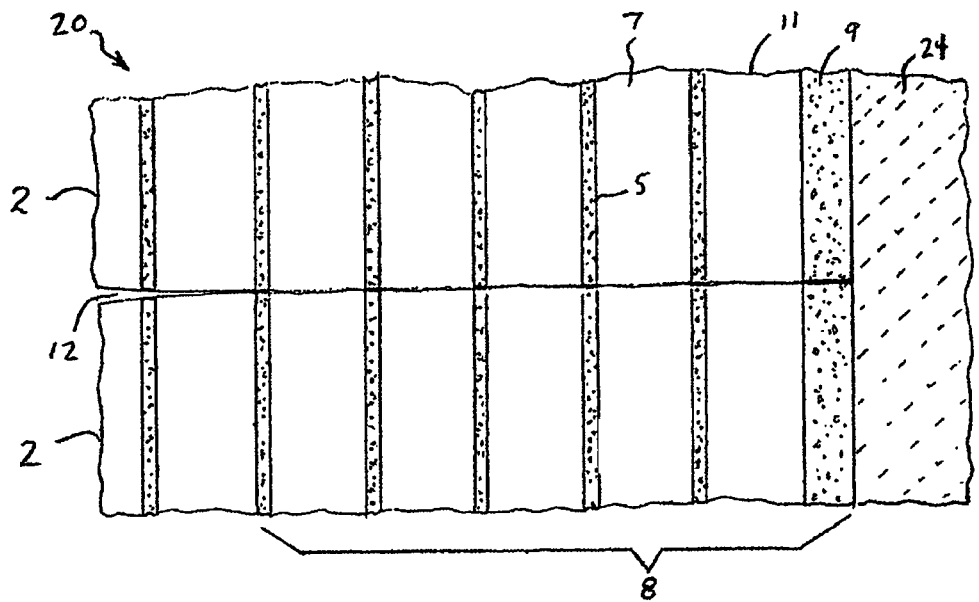
FIG. 5 is an enlargement of the area circled in phantom in FIG. 4, illustrating a first variation of the second embodiment wherein the peripheral portions or peripheral regions of the stacked layers are bonded together.
Figure 6:
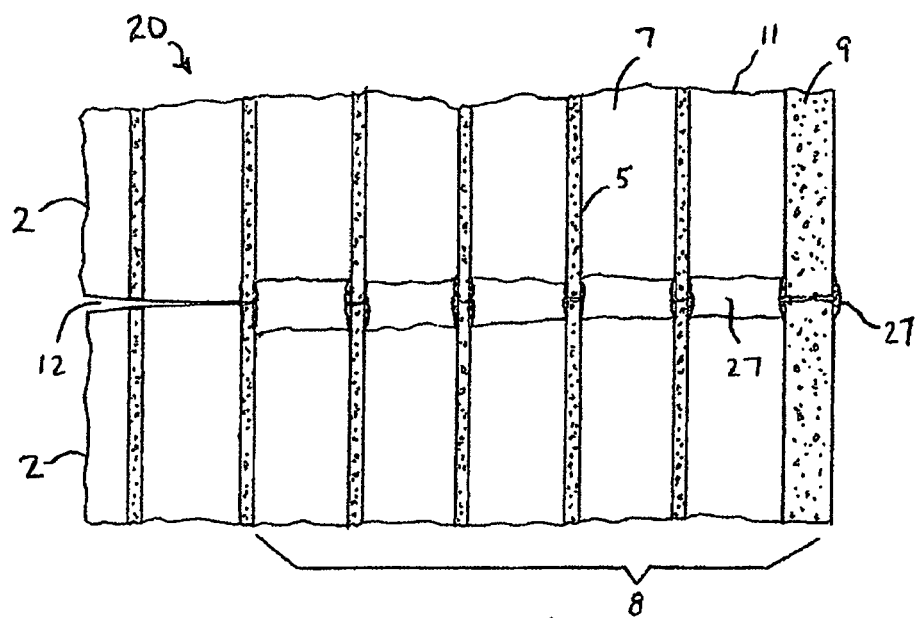
FIG. 6 is an enlargement of the area circled in phantom in FIG. 4, illustrating a second variation of the second embodiment wherein the peripheral portions or peripheral regions of the stacked layers are ceramically pasted to one another.

While the peripheral portion or peripheral region may be an outer skin 9, the peripheral portion or peripheral region may also include an annular portion of honeycomb structure, extending into the honeycomb structure from the outer skin. FIGS. 5 and 6 illustrate two other ways that the peripheral portions or peripheral regions 8 of adjacent disc-shaped layers 2 may be contiguous when they are not integrally formed with one another. They may be aligned or misaligned. In FIG. 5, the peripheral portions or peripheral regions 8 are simply pressed together into sealing engagement. In virtually all applications, the fluid treating device 20 is mounted in a can-shaped receptacle which is in turn connected to a flow of pressurized fluid to be treated. Resilient packing material such as asbestos or vermiculite cloth 24 is wrapped around the outer skin 9 of the device both to provide some shock absorbency between the metal can (not shown) and the fragile outer skin 9 of the device, and to prevent fluid from flowing between the outer skin 9 of the device 20 and the inner surface of the can.

Figure 7A:
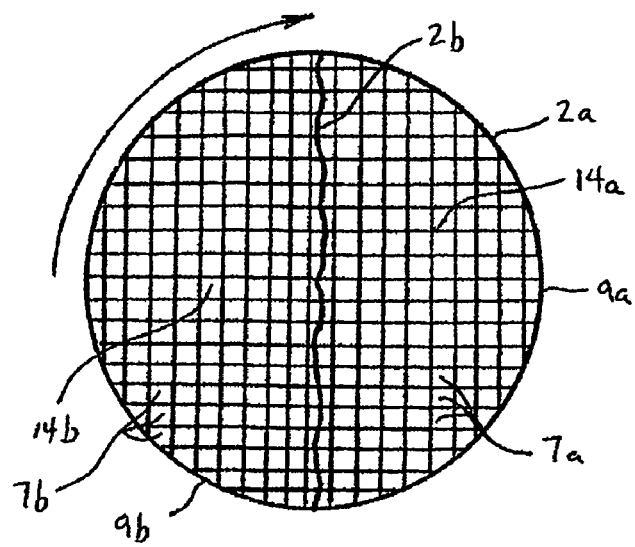
FIGS. 7A and 7B are plan views of the second embodiment of the fluid treatment device wherein the matrix of ceramic walls of adjacent ceramic layers are in alignment and misalignment, respectively.
Figure 7B:
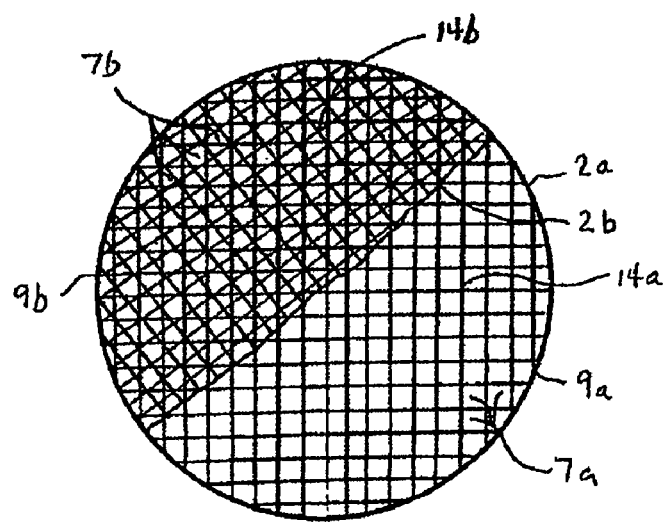

In FIG. 6, a sealing engagement between the peripheral portions or peripheral regions 8 of adjacent layers is accomplished by applying material, such as plugging material or wet ceramic material or ceramic bonding paste 27 between the peripheral portions or peripheral regions of adjacent layers. The use of a wet material 27 is preferred since it provides a more positive fluid seal between the peripheries and further gives the device an integral structure which is easier to handle and install in the can-type container. Sealing is more effective in both the FIG. 5 and FIG. 6 embodiments if the cells 7 are in alignment with one another such that the edges of the web walls 5 of adjacent layers 2 engage one another in line contact. However, sealing contact with or without the use of a bonding material is also possible if the web matrices 3 of adjacent layers 2 are rotated out of alignment with one another (as illustrated in FIG. 7B) due to the engagement of the outer skin 9 of adjacent layers 2 plus point contact between the walls 5 of the cells 7 included within the peripheral portion or peripheral region 8 (which can range between 0 and 15 for a structure 1 having a cell density of 900 cells/in$^2$). As illustrated in both FIGS. 5 and 6, the peripheral portions or peripheral regions 8 border the edge of a lens-shaped axial air space 12.

While the second embodiment 20 of the fluid treating device requires additional assembly steps over the first embodiment 1 as the peripheral portions or peripheral regions 8 of the separate layers 2 of the second embodiment 20 need to be stacked in sealing, contiguous engagement with one another, the second embodiment 20 has two significant advantages over the first embodiment 1. First, the separate layers 2 may be fabricated with different properties to remove or treat different pollutants in a fluid flow. For example, different washcoats of different catalysts may be applied on different layers 2 to sequentially and more effectively oxidize CO, and separately react $NO_x$ into $N_2$ and $O_2$ and separately react and/or capture $SO_x$ or capture heavy metals or particulate matter. Alternatively, one or more of the layers 2 could be formed as a particulate filter, wherein the open ends of the cells 7 at the inlet and outlet ends 13a, 13b are plugged in a "checkerboard" pattern to force the exhaust gases flowing through the device 20 to pass through the porous web walls 5 before exiting the outlet end 13b. Second, as many or as few layers 2 may be stacked to form a customized fluid treatment device 20 having as few as two or three layers but as many as twenty layers. Finally, matrix cells 7a, 7b of different layers 2a, 2b may be either positioned into alignment in the assembled device 20 (as shown in FIG. 7A) or rotated 45° from an aligned position into complete misalignment (as shown in FIG. 7B), or rotated into any position in between. The misaligned position shown in FIG. 7B may have the advantage of increasing turbulent flow and intimate contact with the leading edge faces of the layers 2, possibly at the expense of some increase in back pressure. Hence a large number of customized variations are possible with the second embodiment 20 of the fluid treatment device.

The fluid treatment devices described here may be made of any material used for the treatment of fluids. For example, the honeycomb matrix may be made from organic or inorganic materials, oxide or non-oxide materials. The honeycomb may carry catalytic chemicals or not. Catalytic materials may be imbedded in the honeycomb matrix or may be coated on the surface of the honeycomb matrix. Catalytic material may be uniformly coated on the honeycomb matrix, or partially coated on the honeycomb matrix. For example, a honeycomb layer may just be coated with catalytic materials at its leading edge face. Catalytic materials may be capable of removing $NO_x$, $SO_x$, mercury or other heavy metals, particulate matter, or other pollutants from gas or liquid streams. Those of skill in the art will appreciate that the present invention can be advantageously applied to all manner of fluid treatment devices.

The invention further encompasses methods for manufacturing the various embodiments of the fluid treatment device of the invention. In embodiments, the method generally comprises the steps of: (1) providing a green monolith honeycomb body; and, (2) removing portions of the monolith honeycomb structure to form layers of honeycomb alternating with layers of air space. In alternative embodiments, the method generally comprises the steps of: (1) providing at least two honeycomb ceramic layers as previously described in a stacked configuration between the inlet and outlet of the device, and (2) rendering the peripheral portions or peripheral regions of adjacent stacked ceramic layers mutually contiguous to prevent fluid flowing through said stacked ceramic layers from leaking between said outer skins.

In an embodiment of the method (which results in the first described embodiment of the device, as shown in FIGS. 1 and 2) a single green monolith body of a honeycomb ceramic structure is first provided. Such a green body is manufactured by extruding a paste-like ceramic precursor of cordierite, mullite, silicon carbide or aluminum titanate through a die, and is generally referred to as an "unfinished" ceramic structure, as opposed to a "finished" ceramic structure, which has completed all firing steps. The resulting green body has a honeycomb cell matrix surrounded by a peripheral portion or peripheral region which may or may not include an outer skin. Next, a portion of the cell matrix at one or more sections along the axis of rotation of the green body is removed. This may be done by penetrating the outer skin of the green body with a matrix removal tool at two or more points along the axis of the green body and sweeping the matrix removal tool into the body of the honeycomb structure to form open spaces. Or, a honeycomb matrix can be cut, in half for example, along its longitudinal axis and openings can be introduced into both halves of the opened honeycomb structure, and then the two halves can be sealed back together, forming a discontinuous honeycomb structure. Alternatively, a matrix removal tool which works in "Weed-Eater®" fashion may be inserted along the central axis of the web matrix and periodically actuated. That is, an embodiment of a matrix removal tool may be a rotatable device with a directional opening on a tip end, which allows a length of cutting material to extend out of the directional opening. When the device is rotated about an axis, the cutting material, such as a string of hardened and roughened beads, extending through the tip of the directional opening, operates to remove material from the monolith honeycomb matrix.

To introduce open spaces into a monolith honeycomb structure, a drill bit may be inserted into a green monolith honeycomb body from the side of the honeycomb, and swept across an area of honeycomb structure parallel to the end faces of the structure to create an arc of open space inside the honeycomb body. In this embodiment, the drill bit is a matrix removal tool. To create the desired area of open space, a drill bit may be inserted and swept at multiple sites along and around the honeycomb structure. For example, a desirable honeycomb monolith structure may be cylindrical and may be 4.25 inches in axial length and 3.25 inches in diameter. A desirable discontinuous honeycomb structure may have layers of honeycomb material alternating with areas of open space which are each 0.25 inches tall. To create the open spaces, a two inch long, 0.25 inch diameter drill bit may be inserted at three places at the same elevation along the axial length of the honeycomb body for each desired layer of open space, at, for example, 12 o'clock, 4 o'clock and 8 o'clock and swept into the interior of the honeycomb structure to form an arc of cleared space. By sweeping into the interior of the honeycomb structure at three places, a layer of open space is created. This open space may be disc-shaped. For example, to create the discontinuous honeycomb structure illustrated in FIGS. 1 and 2, these layers would be introduced at eight levels along the axial length of the honeycomb structure, to create eight air spaces or open levels, alternating with honeycomb layers. In alternate embodiments, the open spaces created by this sweeping action may create a disc-shaped open area, or the open area created may be of any shape.

Methods of removing portions of honeycomb may result in layers of open space which are not entirely uniform around the peripheral portion or peripheral region of the open space layer. In a manufacturing application, it might be possible to introduce the desired numbers of drillers or web removal tools into the honeycomb body at the same time, and manipulate both the drill and the honeycomb to create the desired size and shape of open space. By manipulating both the honeycomb and drill, it may be possible to create the desired spaces inside the honeycomb structure by only introducing one drill per open layer. Additionally, this method requires that, after the procedure is complete, entry holes will extend through the exterior wall of the honeycomb structure at the level of each excised open area. These holes can be plugged by inserting plug material, such as cordierite material into the holes. The plug material may be fixed in place by dipping it into wet cordierite or plugging material prior to inserting the plug into the hole in the honeycomb structure. The external surface of this plug may be further ground to remove any plug material that extends past the external surface of the skin.

Figure 8A:
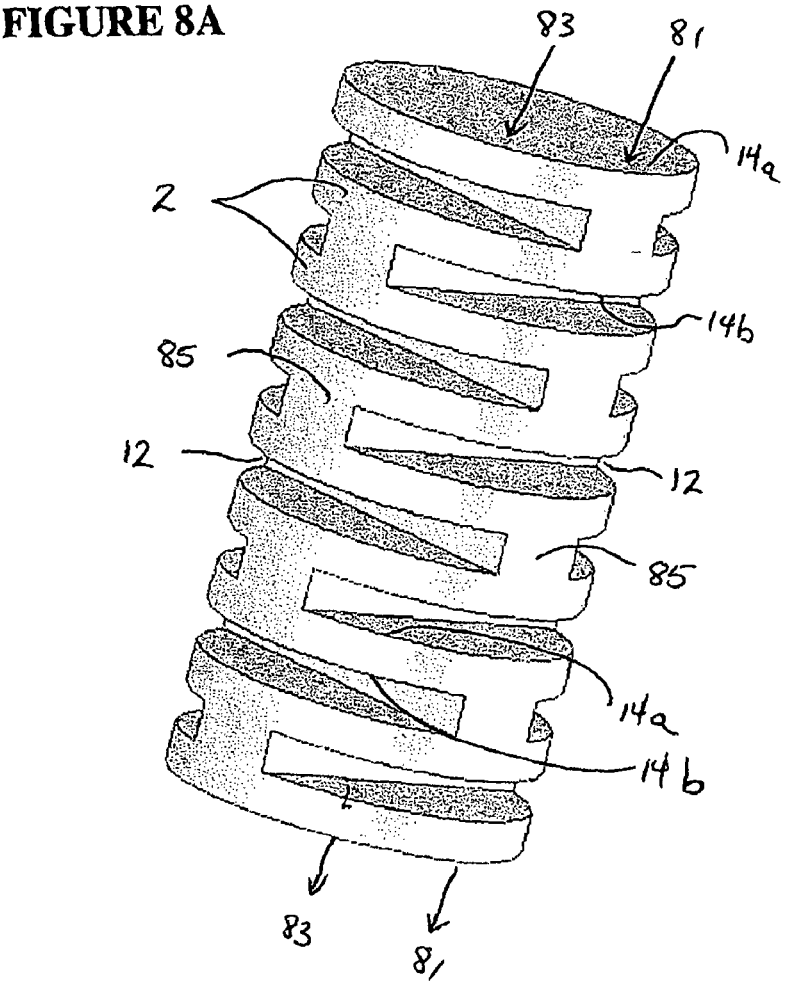
FIGS. 8A and 8B are perspective and top views (respectively) of embodiments of the fluid treatment device wherein the matrix of ceramic walls has been cut away to form a discontinuous matrix.
Figure 8B:
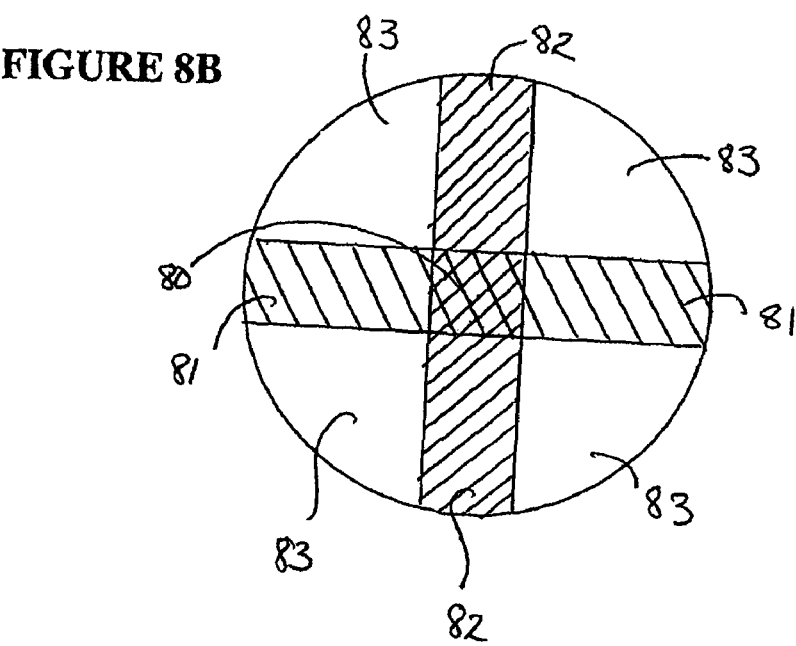

FIGS. 8A and 8B illustrate an embodiment of a monolith honeycomb structure which has been cut away to create air spaces, forming a discontinuous honeycomb structure. As illustrated in FIGS. 8A and 8B, disc-shaped layers of honeycomb structure 2 alternate with layers of air space 12. In this embodiment, a portion of the air spaces contain regions where the honeycomb structure, the network of interconnected walls that form a matrix of elongated, gas-conducting cells, remains intact. This continuous region 85 may be a post, or a bar of material, or may be in any shape. This is illustrated in FIG. 8B. FIG. 8B is a top view of the honeycomb structure illustrated in FIG. 8A. The twice-hatched region 80 in the center of the circle represents area where the honeycomb structure has not been cut away, and is continuous through the entire honeycomb structure. The single-hatched regions 81 and 82 represent areas of alternating continuity between disc-shaped areas of honeycomb structure. In these regions, fluid entering the leading face 14a of one honeycomb layer flows through that layer, through a continuous honeycomb region 85, and through the contiguous adjacent layer, before leaving via the trailing face 14b of the next disc of honeycomb material, into an open space 12. In these regions 81 and 82, the honeycomb structure is imperfectly discontinuous. That is, in these regions, fluid flowing through honeycomb cells flows through three levels or layers of honeycomb structure before entering an open space within the honeycomb structure. This path is illustrated by arrows 83 on FIG. 8A.

The white areas 83 shown in FIG. 8B represent areas which are perfectly discontinuous in this embodiment. That is, in these regions 83, fluid flowing into a leading face 14a of each disc of honeycomb structure, and through the honeycomb structure, empties through the trailing edge face 14b of that disc to an open space 12 before re-entering into the leading face 14a of the next adjacent honeycomb disc. This path is illustrated by arrows 81 on FIG. 8A. While in some embodiments of the present invention, layers of honeycomb structure are perfectly discontinuous, that is, none of the cells of the honeycomb structure are continuous from one layer of honeycomb structure to the next, (see FIG. 2) in some embodiments, at least one cell is continuous across at least one open space. That is, the open spaces within the discontinuous honeycomb structures of the present invention may not extend through all of the cells of the honeycomb structure. Some of these cells may remain intact. FIGS. 8A and 8B illustrate an embodiment of the present invention having at least one layer of air space between honeycomb layers along an axis, where at least one fluid conducting cell is continuous from one layer of honeycomb, across a layer of air space, to a second layer of honeycomb space.

In embodiments, methods of making the discontinuous honeycomb structure result in a monolithic honeycomb structure having an overall axial length between a first end and a second end, the structure comprising a matrix of walls which defines a plurality of parallel, fluid-conducting cells oriented in an axial direction, where a first plurality of continuous walls form uninterrupted cells extending substantially the entire overall axial length and wherein a second plurality of walls form discontinuous cells, wherein the discontinuous cells are open to a common recess within the structure between the first and second ends. The honeycomb structure or fluid treatment device may have multiple structures, as described above. That is, cells may be continuous from a first end to a second end along the entire length of the monolith honeycomb structure, may be continuous along a portion of the axial length of the monolith honeycomb structure, or may be continuous from a first end to a second end across a single layer of honeycomb structure before opening to an open space, or a common recess within the honeycomb structure, or opening to the trailing edge face of the monolith honeycomb structure.

The discontinuous honeycomb structure shown in FIG. 8A is illustrated without a skin. In embodiments, or an after-applied skin, a skin may be applied to the external surface of the discontinuous honeycomb structure to form a unitary honeycomb structure. Or, in an alternative embodiment, the discontinuous honeycomb structure, as illustrated in FIG. 8A, may be "canned" without adding a layer of skin material. For example, the discontinuous honeycomb structure may be wrapped with a layer of packing material such as asbestos or vermiculite and the wrapped, discontinuous structure can be inserted into a mounting can to form a honeycomb filter within a metal outer skin.

Figure 9A:
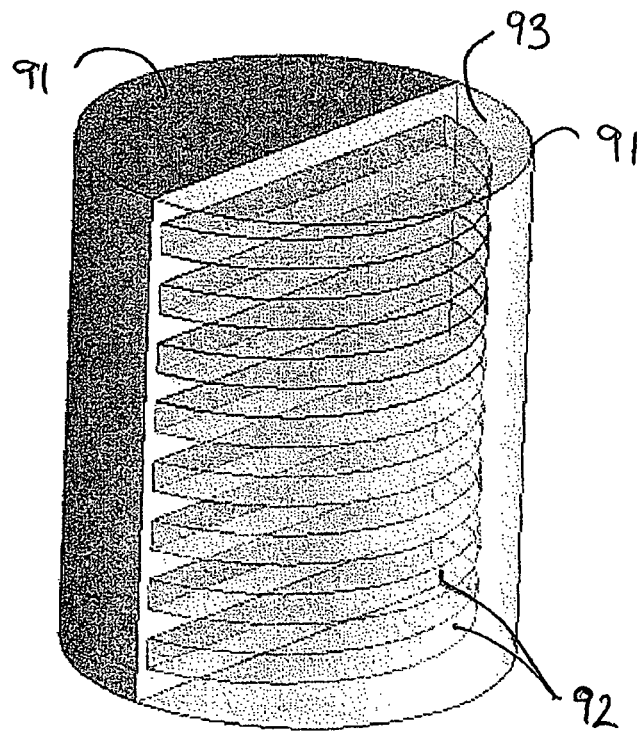
FIGS. 9A and 9B are partial cut-away and top views (respectively) of embodiments of the fluid treatment device wherein the matrix of ceramic walls has been cut away to form a discontinuous matrix.
Figure 9B:
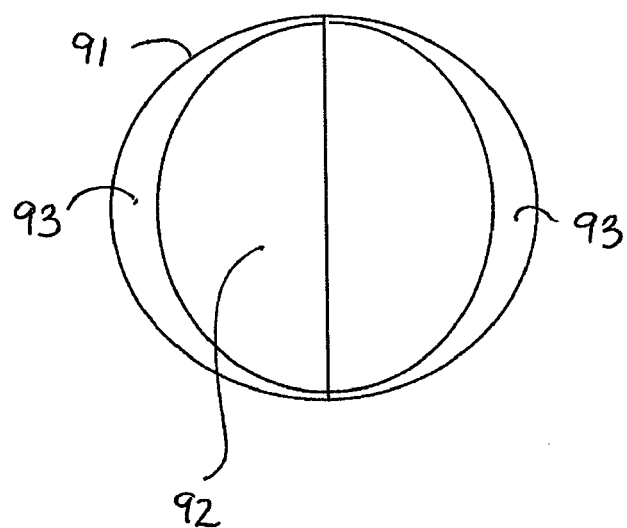

FIGS. 9A and 9B are partial cut-away and top views (respectively) of embodiments of the fluid treatment device where the matrix of ceramic walls has been cut away to form a discontinuous matrix. In the embodiment illustrated in FIGS. 9A and 9B, a monolith green honeycomb structure is first provided. The monolith green honeycomb structure is cut in half along the axis of the structure parallel with the honeycomb cells. The half-honeycomb structure 91 is then cut with a round cutting wheel to introduce disc-shaped openings 92 in the half-honeycomb structure 91. The cut portion, resulting in a disc-shaped opening or open space 92, may not be entirely uniform around the peripheral portion or peripheral region 93 of the open space layer 92, resulting in discontinuous honeycomb structures having some cells which are continuous and extend through the entire length of the honeycomb structure 93. Once each half-honeycomb structure 91 has been cut, the two half-honeycombs 91 are aligned and fixed together. The two halves may be fixed together by application of a wet ceramic material at the interface, or by any method known in the art. Once the green articles are cut and put back together, the green article can be fired and finished. The steps of fixing the two half-honeycomb structures 91 back together, firing and finishing may occur in any order, as will be understood by those in the art. As illustrated in 9B, the non-uniform excision of material results in a honeycomb structure having at least one layer of air space disposed between honeycomb layers along the axis, where at least one fluid-conducting cell is continuous from one honeycomb layer, across the layer of air space, to a second layer of honeycomb matrix. In this embodiment illustrated in FIGS. 9A and 9B these continuous cells are around the periphery of the open space layers. Around the periphery, this plurality of parallel fluid-conducting cells extends substantially the entire overall axial length, while the internal cell walls form discontinuous cells. In the internal portion of the embodiment shown in FIGS. 9A and 9B, the discontinuous cells are open to a common recess within the structure between the first and second ends.

Figure 10:
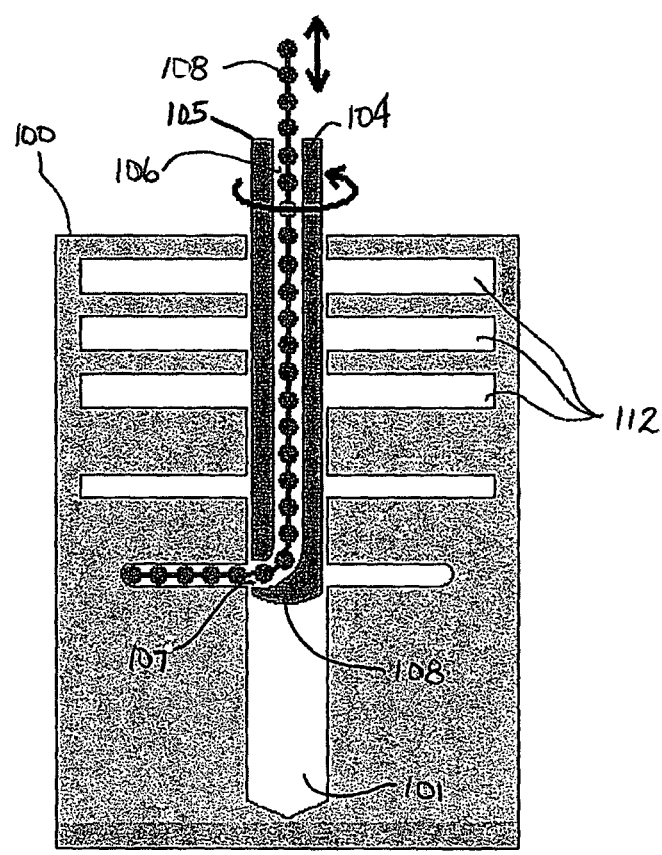
FIG. 10 illustrates an embodiment of a matrix removal tool.

An alternative embodiment of a method for cutting away portions of a honeycomb body to form discontinuous honeycomb structures from a monolithic structure is through the use of a rotatable matrix removal tool. FIG. 10 illustrates an embodiment of such a matrix removal tool. In FIG. 10, a honeycomb matrix 100 is shown. The honeycomb matrix 100 has been drilled to form a hole 101 in its center structured and arranged to accommodate the matrix removal tool 105. The matrix removal tool 105 is shown inserted into the hole 101 in the honeycomb matrix 100. The matrix removal tool 105 has a rotatable tube 104 with a central bore hole 106 and a directional outlet 107 at its tip 108. In this embodiment, the matrix removal tool 105 is a rotatable tube 104 with a directional outlet 107 structured and arranged to contain a strand of beads 108. As the tube 104 of the matrix removal tool is rotated, the strand of beads 108 extends into the body of the honeycomb matrix and removes or carves out layers of material from the honeycomb matrix. The beads may be made from steel or hardened steel and may be reinforced with abrasive coating such as nickel metal imbedded with silicon carbide particles. In additional embodiments, the strand of beads 108 may be another type of flexible cutting device such as a chain or ribbon, of any type of material which is flexible enough to bend through the directional outlet 107 and strong enough to cut through the green honeycomb matrix 100. The tube 104 can be introduced into the honeycomb structure until it reaches a desired depth. The strand of beads can be introduced through the tube and into the honeycomb structure until the matrix removal tool reaches a desired depth. The matrix removal tool is then rotated to remove material from the interior of the honeycomb structure 100. This can be repeated at multiple levels within the honeycomb structure to create layers of open space 112 alternating with layers of honeycomb matrix in the honeycomb structure. This method may result in layers that are shaped or concave, due to gravity causing the beaded removal tool to sag, or due to wobble that might exist in the system.

When this method is complete, a hole, structured and arranged to accommodate the tube will remain through, or partly through, the full length of the discontinuous honeycomb structure. This hole may be plugged with a tube-sized plug of solid or honeycomb cordierite material, which may or may not extend through the full length of the hole.

Utilizing this method, the matrix removal step defines at least two honeycomb ceramic layers alternating with a spacer layer in a stacked or discontinuous configuration wherein the peripheral portions or peripheral regions of adjacent stacked ceramic layers are integrally connected to one another. In addition, cells defined by the honeycomb matrix walls along the peripheral portion or peripheral region of the honeycomb body may remain intact, with some cells extending along the entire length of the honeycomb structure intact and continuous. Finally, the discontinuous honeycomb body is finished and fired. Finishing may include plugging damage to the exterior and/or interior of the structure caused by the introduction of a web removal tool, the application of precious metals to act as catalytic metals, grinding the exterior of the discontinuous honeycomb structure to create a desired shape, applying an exterior skin layer if necessary, grinding the exterior faces of the structure, and plugging the exterior faces of the discontinuous honeycomb structure.

These methods of manufacturing a honeycomb structure may be preferable to methods of manufacturing continuous honeycomb structures. Firing and sintering ceramic structures, especially large-scale ceramic structures having complex shapes, can be a very difficult process. As a ceramic article heats in a kiln, temperature variations between the external surfaces of the article and interior structures of the article can heat at different rates, depending upon variations in the architecture of the item. These variations in heating can lead to non-uniform shrinkage, mechanical stresses, and cracking or microcracking of the article, and can eventually lead to failure of the part in service. These discontinuous honeycomb articles, because they include significant air spaces inside the structures, allow for more uniform heating, because paths are opened for radiative heat transport and because hot air inside kilns is able to circulate more fully through the articles. Therefore, these articles experience reduced cracking in firing. In addition, because of the increased air spaces, firing times may be reduced. Firing time, the time that a ceramic article must spend in a kiln, is a major manufacturing expense in time and in energy costs. Therefore, reductions in firing time can provide significant manufacturing advantages.

In an additional embodiment of the method (which results in the second described embodiment of the device, as shown in FIGS. 3 and 4), a single unfinished honeycomb ceramic structure, a monolith, is first provided. This unfinished honeycomb ceramic structure is cut orthogonally with respect to its axis of rotation to form at least two layers, each of which includes opposing faces. These layers may be fired before or after they are assembled to form a stacked honeycomb structure. In addition, the layers may be further processed. For example, layers may be plugged to form particulate filters or coated with catalytic metals. The faces of the layers may be shaped or recessed. This may be done by using a grinding tool to grind a symmetrical concave shape into the faces of layers. The recessed layers are then stacked with the peripheral portions or peripheral regions of the layers in mutually contiguous engagement with one another, in a configuration allowing for the alignment or misalignment of the honeycomb cells, as desired. Such mutually contiguous engagement may be achieved by wrapping the layers in asbestos or vermiculite packing material and pushing the wrapped, stacked layers into a mounting can. Alternatively, the peripheral portions or peripheral regions of the layers may be joined, pasted, or bonded to one another. The concave shape of the mutually opposing faces of adjacent layers provides axial, lens-shaped spaces between the layers. The discontinuous honeycomb body may then be finished and, if necessary, fired. Finishing may include the application of precious metals to act as catalytic metals, grinding the exterior of the discontinuous honeycomb structure to create a desired shape, applying an exterior skin layer, grinding the exterior faces of the structure, and plugging the exterior faces of the discontinuous honeycomb structure.

Again, articles assembled from fired layers of honeycomb material or fired after the layers are assembled should require reduced firing time. If the layers are cut while green and then fired, firing time for layers which are only a fraction of the size of the continuous honeycomb structure should be significantly reduced. Or, if the articles are fired after they are assembled, the increased air flow through discontinuous articles should improve kiln times as described above. The above-described articles and methods of making the articles can be further understood by considering the following Examples.

EXAMPLES

Example 1

Heat-Up Profiles

Figure 11B:
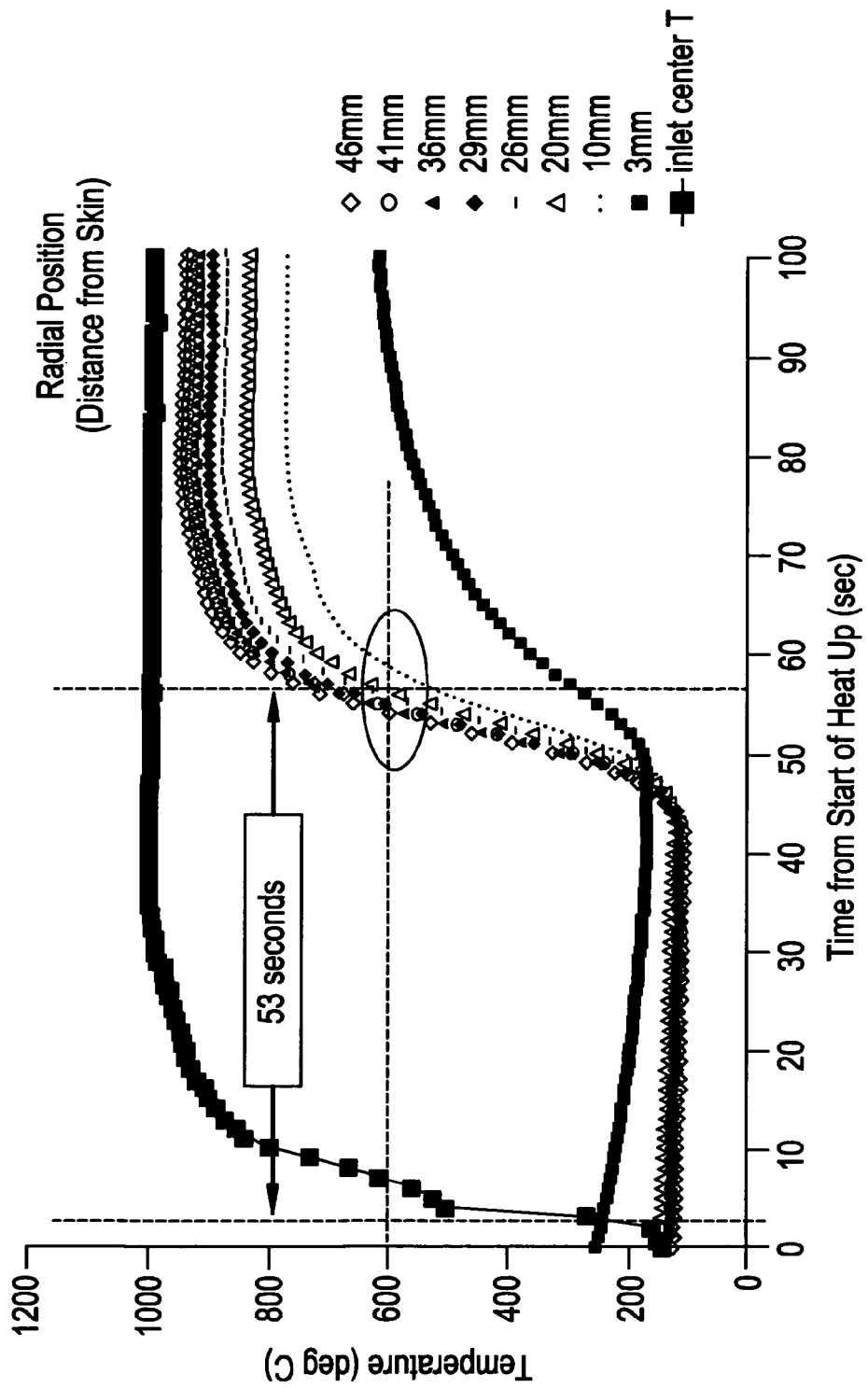

FIGS. 11A and 11B compare the amount of time required for a standard, continuous matrix ceramic honeycomb structure (FIG. 11A) and a discontinuous cell wall substrate (FIG.

11B) of the invention to obtain a temperature profile across their diameters that would be effective in activating a catalyst for breaking down automotive exhausts. The ceramic honeycomb structure used to obtain the graph of FIG. 11B had a matrix 3 formed from integrally formed, disc-shaped matrix layers 2 separated by axial air spaces 12 as illustrated in FIGS. 1 and 2. The diameter, cell density, web thicknesses and ceramic material 9 (aluminum titanate) of the two structures were identical (4.25 inches in length, 3.66 inches in diameter 600/4 substrate), the only difference being that the honeycomb structure embodying the invention shown in FIG. 11B had eight disc-shaped axial spaces in its web matrix 3 that defined axially spaced apart honeycomb layers 2. The temperature profiles were measured during a thermal cycling test in which the temperature of air conducted through the prior art and inventive ceramic structures was stepped up from about 100° C. to 1000° C. at time zero. The temperatures across the diameter of the structures were measured using 0.010 inch diameter thermocouples that were positioned longitudinally ⅔ of the distance from the inlet ends 13a of the structures, (approximately 67 mm from the inlet end). The radial positions of the thermocouples spanned from the center of the structures to very near the skin 9, the measured radial distances from the skin 9 being indicated to the right of the graphs.

FIG. 11B shows that the time required for most of the central area of the matrix 3 to achieve 600° C. or higher within the discontinuous ceramic structure embodying the invention was 23% shorter than that of the standard ceramic structure shown in FIG. 11A (i.e. 42 seconds for a ceramic honeycomb structure embodying the invention vs. 62 seconds for a prior art ceramic honeycomb structure). This accelerated heat-up may be due to the reduction in overall thermal mass of the substrate that has interruptions in its cell walls along its axial length. This translates to substantially faster light-off times in automobile catalytic converters employing embodiments of the invention.

Example 2

Radial Thermal Profiles During Heat-Up

Figure 12:
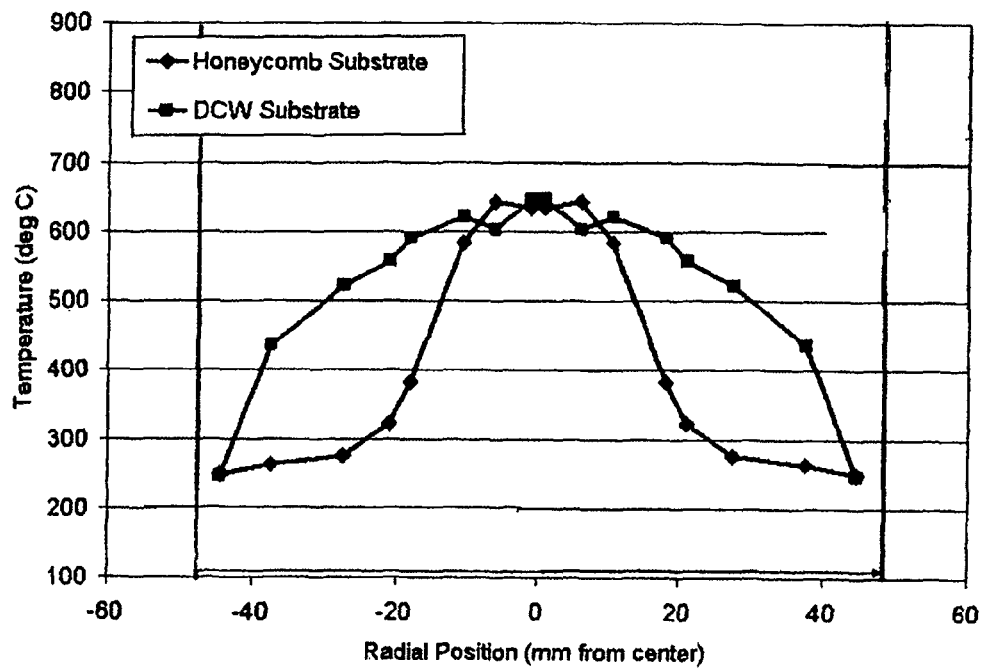
FIG. 12 is a graph comparing a radial thermal profile of a prior art ceramic honeycomb structure and a layered honeycomb structure embodying the invention, illustrating the more uniform heat-up of the layered honeycomb structure embodying the invention over a shorter period of time when a hot gas is conducted through it.

FIG. 12 compares the radial temperature profiles for a prior art, continuous ceramic honeycomb structure and a discontinuous cell wall substrate honeycomb structure embodying the invention having axially spaced-apart, integrally connected layers 2. Because the center of the horizontal axis corresponds to the axis of rotation of these two structures, it is somewhat easier to appreciate the differences in the two thermal profiles. As is the case with comparative FIGS. 11A and 11B, the diameter, cell density, web thicknesses and ceramic material of the two structures were identical, the only difference being that the honeycomb structure embodying the invention had disc-shaped spaces in its matrix 3 that defined eight axially spaced apart honeycomb layers 2. Measurements were taken from thermocouples located 67 mm from the inlet. These graphs clearly indicate that while the center sections of the two structures achieve about the same temperature when they are exposed to a gas flow of 1000° C., an annular section of the ceramic honeycomb structure of the invention having a radius of between 10 mm and 45 mm (where the substrate radius was 47 mm) achieves a substantially hotter temperature than the same annular section of a prior art ceramic honeycomb structure despite an 18.5% shorter time that the layered ceramic honeycomb structure is exposed to the gas flow. That is the data shown in FIG. 12 is taken 53 seconds from the start of heat-up of the inlet gas stream for the discontinuous substrate, DCW, and after 64 seconds for the continuous honeycomb substrate. Thus the inventive discontinuous ceramic wall (DCW) honeycomb structure obtains a thermal profile across its radius that is capable of activating more of an exhaust-treating catalyst across the diameter of the structure in a shorter period of time after start-up when the ceramic structure is used as a catalytic converter, resulting in a more efficient product. The DCW substrate heats up faster and more uniformly.

Example 3

Back Pressure Comparisons

Figure 13:
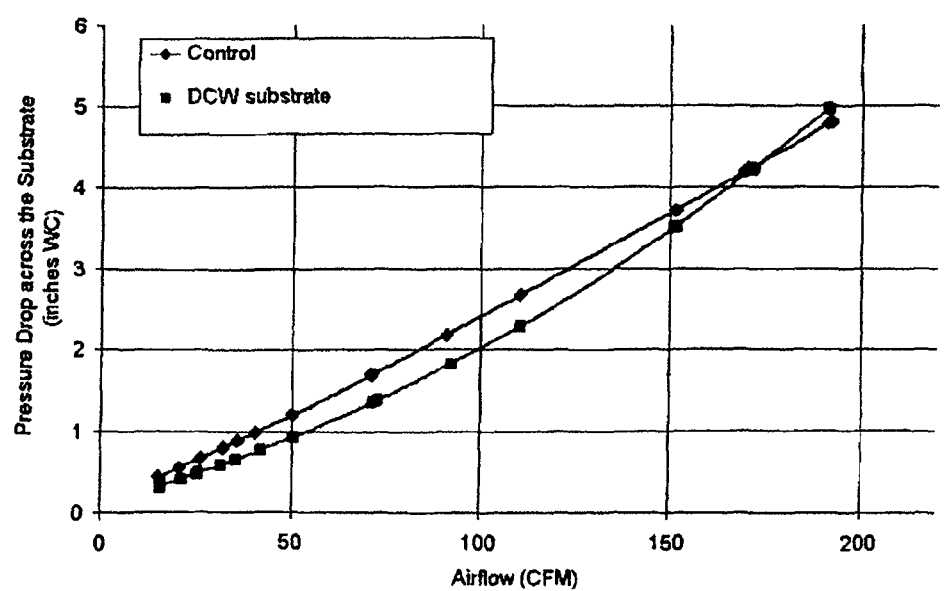
FIG. 13 is a graph comparing the pressure drop of a prior art ceramic honeycomb structure and a layered honeycomb structure embodying the invention over different airflow rates.

FIG. 13 compares the back pressure, or pressure drop, that a standard and a layered ceramic honeycomb structure, both of which were 3.66 inches in diameter, 4.25 inches in length 600/4 substrates, apply to an airflow ranging between 10 and 190 cfm (cubic feet per minute). As can be seen from a comparison of the two graphs, the pressure drop associated with a ceramic honeycomb structure of the invention (where eight, 0.25 inch sections of the web matrix have been removed to define matrix layers) is approximately 10% lower for an airflow of between about 10 and 170 cfm, thus underscoring still another advantage of the invention.

Example 4

Figure 14:
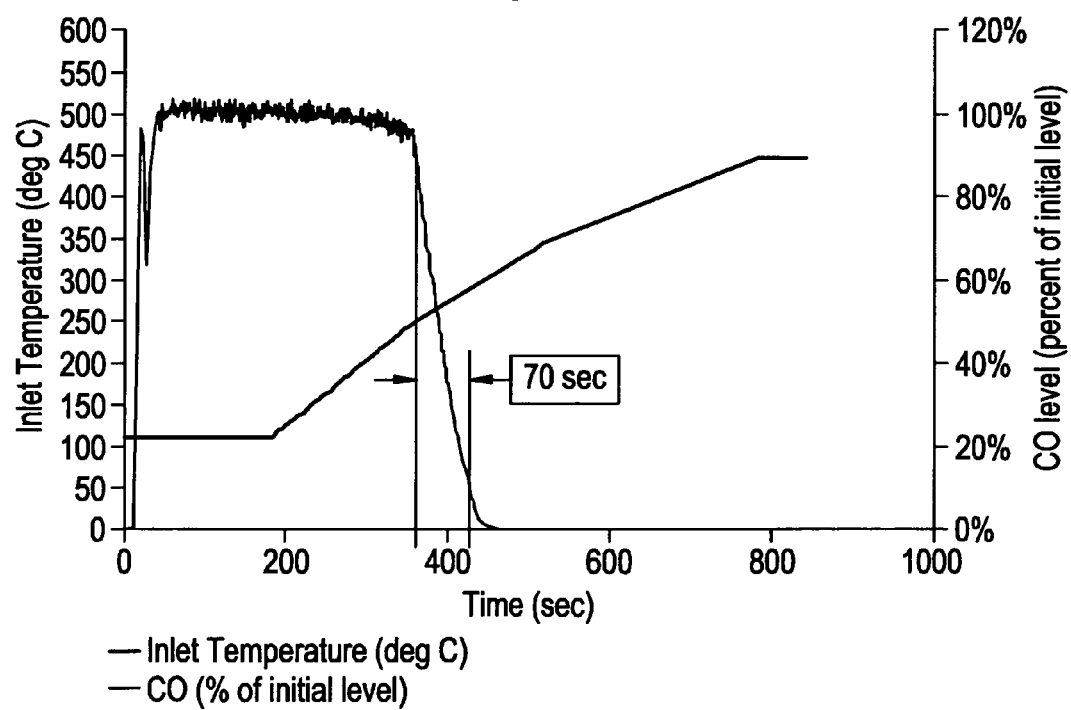
FIGS. 14 and 15 are graphs illustrating the differences between a prior art ceramic honeycomb structure and a layered honeycomb structure of the present invention related to light-off temperature, and efficiency of reduction of emission pollutants.
Figure 15:
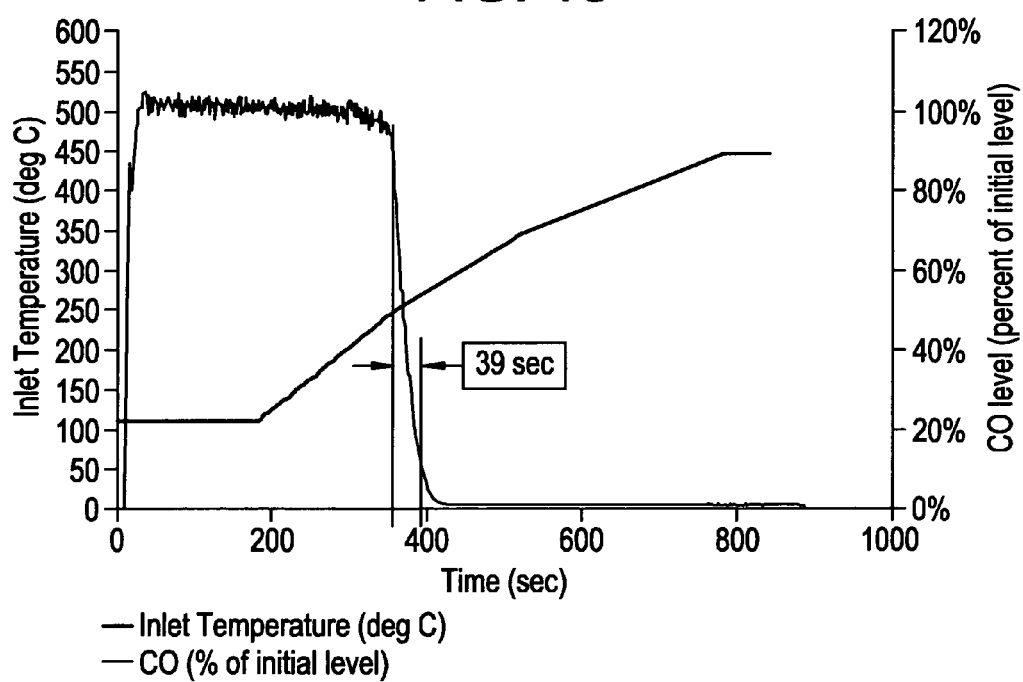

Comparisons of Efficiency Including Time to Heat-Up Time to Conversion and Light-Off Temperature FIGS. 14 and 15 illustrate differences between the standard continuous honeycomb structure (FIG. 14) and a discontinuous wall substrate (FIG. 15) of the present invention. FIG. 14 shows that the light off temperature, the temperature measured at the time at which CO levels dropped to 50%, in the standard article is 269.5° C., at a time T of 389.5 seconds and the time necessary to go from 10% conversion of CO to 90% conversion of CO was 70 seconds, shown by the arrows in FIG. 14. By comparison, for a discontinuous honeycomb of the present invention having 4 layers of honeycomb alternating with three layers of air spaces, the light-off temperature was 252° C., at a time T of 361 seconds, and the time necessary to go from 10% conversion of CO to 90% conversion of CO was 39 seconds, shown by the arrows in FIG. 15. On average, comparing the results of 4 experiments, the light-off temperatures were 13° C. lower and the time to go from 10% CO conversion to 90% CO conversion are 45% shorter using embodiments of the present invention. Lowering light-off temperatures may lead to increased longevity in a final product. In applications where the catalytic converter is close coupled to the automobile engine, the substrate will at times see excessive temperatures that will shorten the life of the catalyst. The discontinuous ceramic wall substrate may provide benefit in such cases because the radial T profile will be more uniform and because the open space regions within the substrate will enable radiative heat transport that will at high temperatures cause the substrate to run cooler. This example illustrates that embodiments of the present invention provide exhaust gas treatment devices that are more efficient.

Taken together, the examples presented here illustrate that the discontinuous or layered honeycomb substrates of the present invention provide products that have greater efficiency, improved catalyst utilization, reduced pressure drop, more uniform flow, lower maximum temperatures, and may be less susceptible to damage during manufacturing and use than continuous honeycomb substrates. The foregoing description of the specific embodiments reveals the general nature of the invention that others can, by applying knowledge within the skill of the art, readily modify and/or adapt for various applications such specific embodiments, without undue experimentation and without departing from the general concept of the present invention. Such adaptations and modifications, therefore, are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of skill in the art.

The invention claimed is:

1. A fluid treatment device comprising:
    at least two ceramic honeycomb layers arranged in a stacked configuration, each layer including a matrix of walls that defines a plurality of parallel, fluid-conducting cells oriented along an axis, each layer having opposing end faces,
    wherein at least one of the faces of the honeycomb layers is shaped to create a recess space between adjacent stacked honeycomb layers.

2. The fluid treatment device of claim 1 wherein at least one of the faces of the honeycomb layers is concave.

3. The fluid treatment device of claim 2, wherein each layer further comprises a peripheral portion.

4. The fluid treatment device of claim 3 wherein the peripheral portion comprises skin.

5. The fluid treatment device of claim 4 wherein the peripheral portion comprises skin and between about 0.00 to 0.50 inches of matrix.

6. The fluid treatment device of claim 4 wherein the peripheral portion comprises skin from adjacent stacked honeycomb layers.

7. The fluid treatment device of claim 6 wherein the peripheral portion comprises skin from adjacent stacked honeycomb layers which is bonded together.

8. The fluid treatment device of claim 7, wherein said honeycomb layers comprise between 20% and 80% of the total volume of the fluid treatment device, and the remaining 80 to 20% of the total volume of the fluid treatment device comprises air space.

9. The fluid treatment device of claim 8 wherein the honeycomb layers comprise between 50 and 70% of the total volume of the fluid treatment device, and the remaining 30 to 50% of the total volume of the fluid treatment device comprises air space.

10. The fluid treatment device of claim 1 wherein the matrix of walls comprises cordierite, aluminum titanate, mullite, silicon carbide or carbon.

11. The fluid treatment device of claim 1 wherein the matrix of walls is coated with a catalyzing material.

12. The fluid treatment device of claim 11 wherein the matrix of walls is partially coated with a catalyzing material.

13. The fluid treatment device of claim 1, wherein the inlets and outlets of the cells defined by the matrix of walls of each of said honeycomb layers are uniformly-shaped, and wherein the inlets and outlets of the cells of adjacent honeycomb layers are aligned.

14. The fluid treatment device of claim 1, wherein the inlets and outlets of the cells defined by the matrix of walls of each of said honeycomb layers are uniformly-shaped, and wherein the inlets and outlets of the cells of adjacent honeycomb layers are misaligned.

15. The fluid treatment device of claim 1 wherein the opposing end faces define inlets and outlets of said cells,
    wherein the opposing end faces of adjacent honeycomb layers are axially spaced apart; and
    wherein at least one of the opposing end faces of the honeycomb layers is concave, and wherein the fluid treatment devices further comprises a peripheral portion including an outer skin; and
    wherein the fluid treatment device is an exhaust gas treatment service.

16. The fluid treatment device of claim 15, wherein the peripheral portions of adjacent stacked layers are bonded together.

17. The fluid treatment device of claim 15, comprising between two and twenty honeycomb layers.

18. The fluid treatment device of claim 15, wherein said ceramic honeycomb layers comprise one or more of cordierite, silicon carbide, mullite and aluminum titanate.

19. The fluid treatment device of claim 15, wherein at least one of said honeycomb layers comprises a particulate filter.

20. The fluid treatment device of claim 15, wherein said adjacent layers are axially spaced apart a distance equal to between about 10% and 100% of an axial length of the fluid treatment device.

21. A fluid treatment device comprising:
    at least two ceramic honeycomb layers each comprising a matrix of walls which defines a plurality of parallel, fluid-conducting cells oriented along an axis, said matrix having opposing faces defining inlets and outlets of said cells,
    at least one layer of air space disposed between honeycomb layers along the axis;
    wherein at least one fluid-conducting cell is continuous from one honeycomb layer, across the layer of air space, to a second honeycomb layer.

22. The fluid treatment device of claim 21 wherein the matrix of walls comprises a ceramic material.

23. The fluid treatment device of claim 21 wherein the ceramic material comprises cordierite, aluminum titanate, mullite, silicon carbide or carbon.

24. The fluid treatment device of claim 21 wherein at least one honeycomb layer is coated with a catalyzing material.

25. A fluid treatment device comprising:
    a monolithic ceramic honeycomb structure having an overall axial length between first and second ends, the structure comprising a matrix of walls which defines a plurality of parallel, fluid-conducting cells oriented in an axial direction, wherein a first plurality of continuous walls form uninterrupted cells in a peripheral portion, extending substantially the entire overall axial length and wherein a second plurality of walls form discontinuous cells, wherein the discontinuous cells are open to a common recess within the structure between the first and second ends.

26. The fluid treatment device of claim 25 further comprising a plurality of the monolithic ceramic honeycomb structures.

27. A fluid treatment device comprising:
at least two ceramic honeycomb layers arranged in a stacked configuration, each layer including a matrix of walls that defines a plurality of parallel, fluid-conducting cells oriented along an axis, each layer having a leading edge face and a trailing end face;
at least one layer of air space disposed between honeycomb layers along the axis;
wherein at least one honeycomb layer has a coating of catalytic material at the leading edge face and does not have a coating of catalytic material at the trailing edge face.

* * * * *